No. 854,882. PATENTED MAY 28, 1907.
E. E. GAMON.
WATER METER.
APPLICATION FILED MAR. 12, 1906.
4 SHEETS—SHEET 2.

WITNESSES:
INVENTOR.
Ernest E. Gamon
BY Fischer & Sanders
ATTORNEYS.

No. 854,882. PATENTED MAY 28, 1907.
E. E. GAMON.
WATER METER.
APPLICATION FILED MAR. 12, 1906.

4 SHEETS—SHEET 3.

WITNESSES:
William J. Brewer
E. A. Alliston

INVENTOR.
Ernest E. Gamon
BY Fischer & Sanders
ATTORNEYS.

No. 854,882. PATENTED MAY 28, 1907.
E. E. GAMON.
WATER METER.
APPLICATION FILED MAR. 12, 1906.

4 SHEETS—SHEET 4.

WITNESSES:

INVENTOR.
Ernest E. Gamon
BY Fischer & Sanders
ATTORNEYS.

UNITED STATES PATENT OFFICE.

ERNEST E. GAMON, OF LONG ISLAND CITY, NEW YORK, ASSIGNOR TO NEPTUNE METER COMPANY, OF LONG ISLAND CITY, NEW YORK, A CORPORATION OF NEW JERSEY.

WATER-METER.

No. 854,882.          Specification of Letters Patent.          Patented May 28, 1907.

Application filed March 12, 1906. Serial No. 305,486.

*To all whom it may concern:*

Be it known that I, ERNEST E. GAMON, a citizen of the United States, residing at Long Island City, in the county of Queens and State of New York, have invented certain new and useful Improvements in Water-Meters, of which the following is a description, reference being had to the accompanying drawings and to the letters of reference marked thereon.

My invention relates to improvements in connection with so-called continuous flow oscillating water meters, and more especially to the means for connecting them with the pipe, the passage of the water through which is to be measured.

The primary object of my invention is to so construct a fitting to be used in connection with water meters, as to enable the meter to be attached to the fitting and the water turned on after the meter is fully connected, or off before disconnecting the meter and so arranged that putting on or detaching the meter turns on or off the water from both the inlet and outlet passages of the fitting.

Another object of my invention is to provide the meter with a timing or registering screw, so arranged that any one versed in the art can readily adjust the meter to make the inlet and outlet ports of the meter register with corresponding ports in the fitting.

A further object of my invention is to provide a ground female taper in the lower portion of the meter with annular grooves therein for the purpose of allowing water to flow in and out when the valve is turned on regardless of whether the ports register or not.

A still further object of my invention is to provide a cap, commonly termed by-pass, constructed with translatingly connected water-ways, which can be fastened to the valve when the meter is removed and operate the valve so as to permit water to pass through when the valve is turned in the right position.

Figure 1:
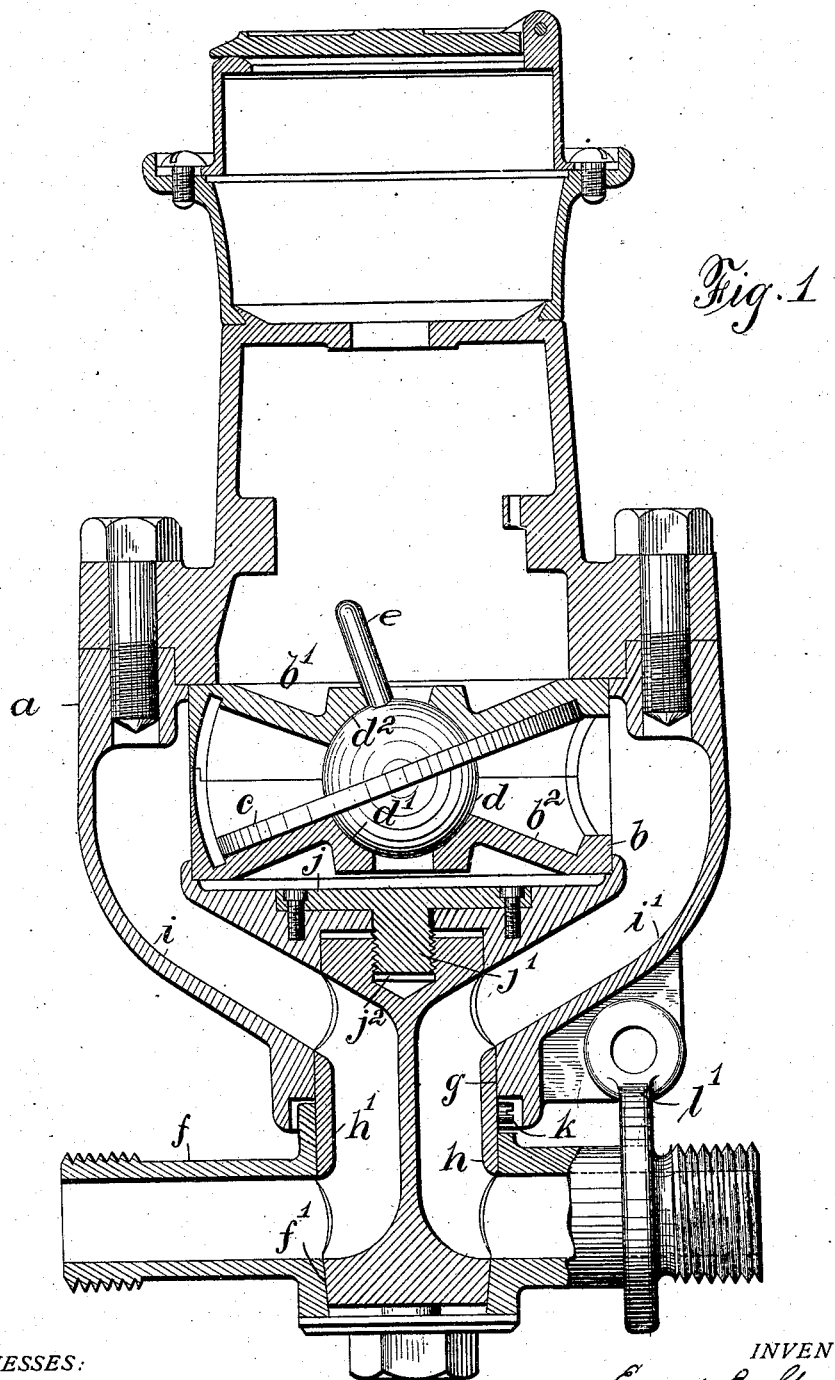
Figure 2:
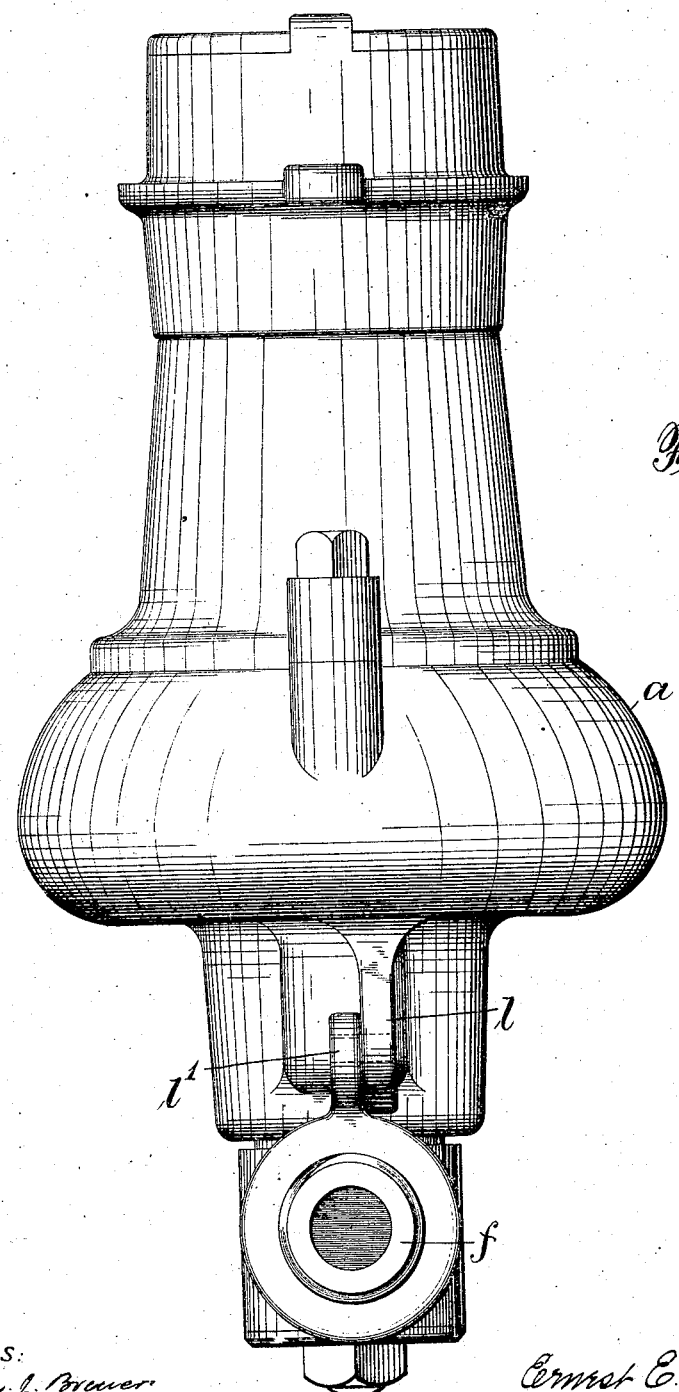
Figure 3:
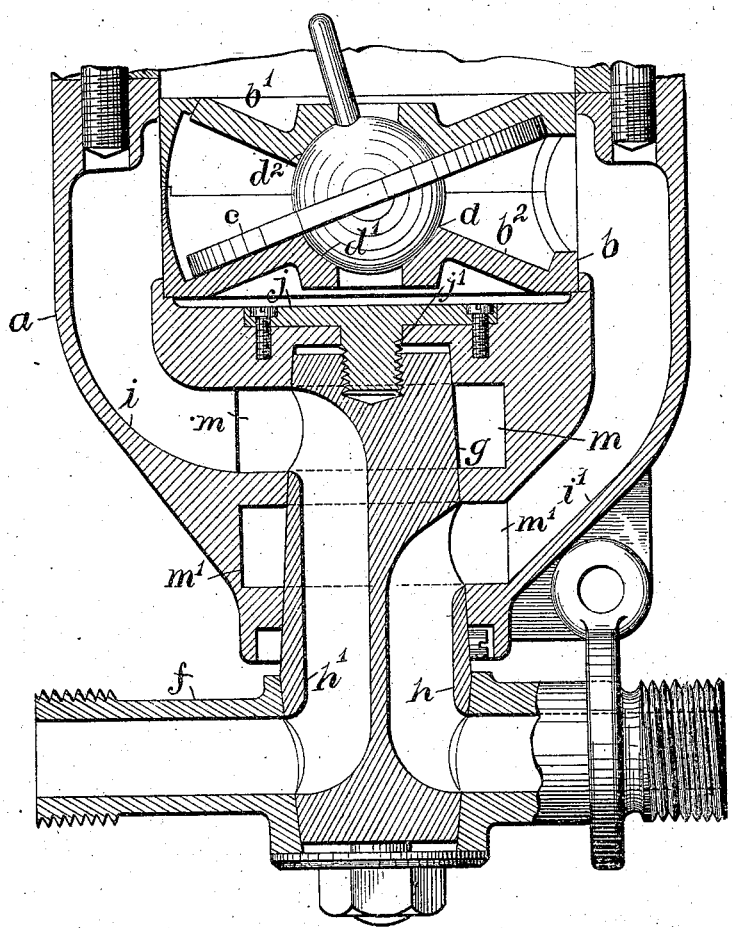
Figure 8:
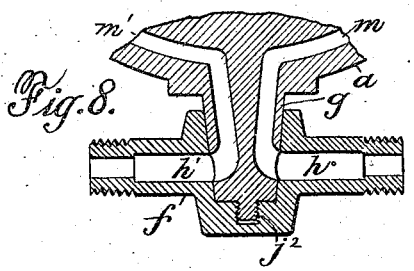
Figure 9:
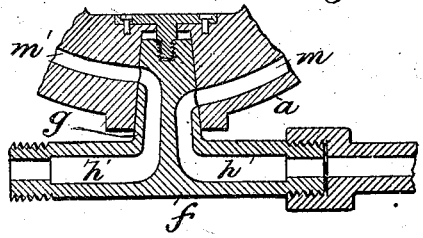
Figure 4:
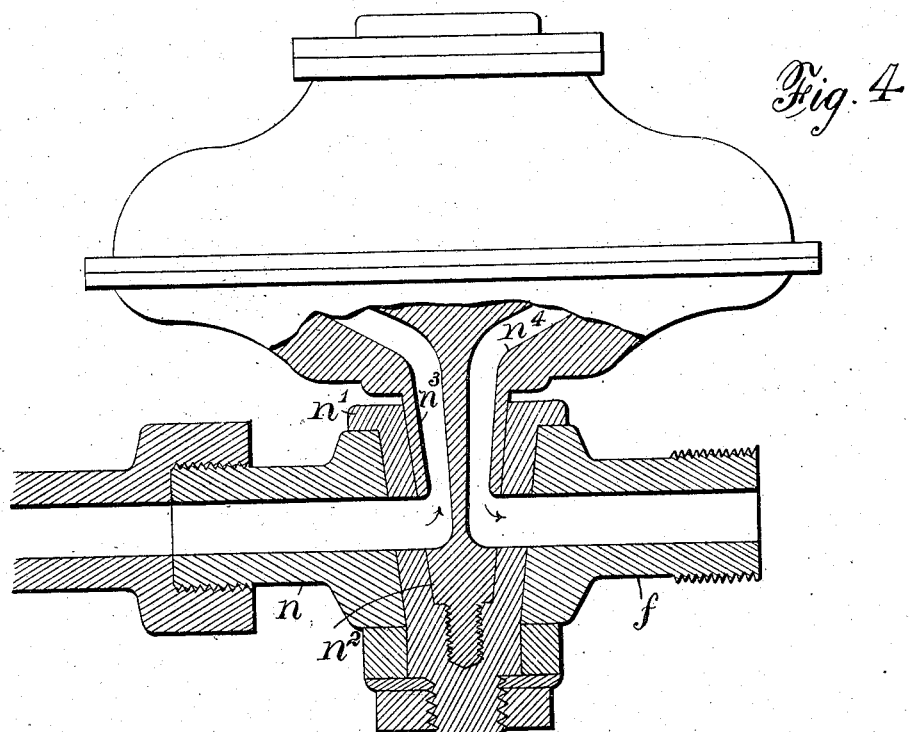
Figures 5, 6:
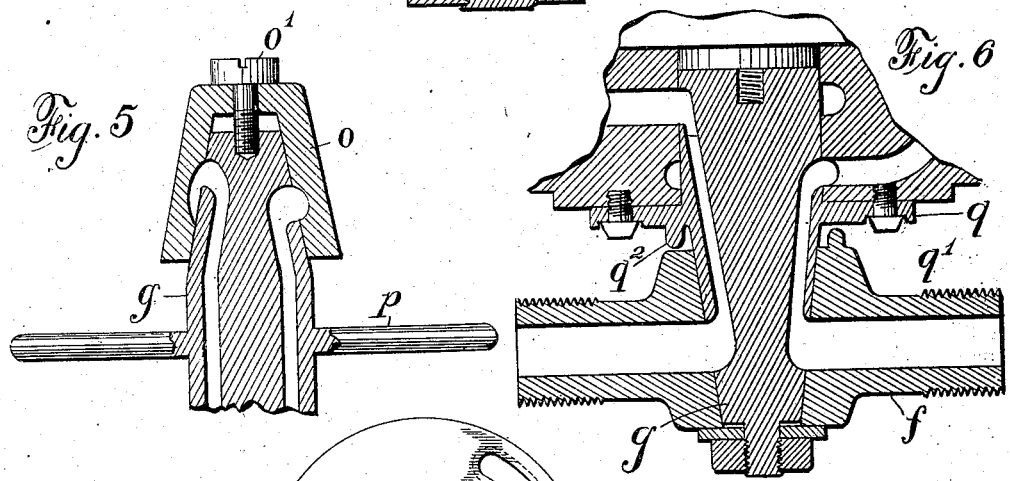
Figure 7:
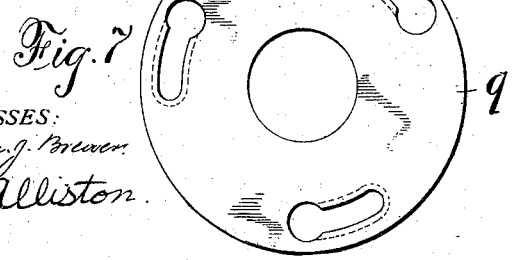

Other details of the improvements will appear and be referred to in the following description in connection with the accompanying drawings, in which:

Figure 1 represents a sectional elevation of a water meter embodying a form of my invention. Fig. 2 represents a side elevation and external view of the same. Fig. 3 represents an elevation partly in section of a water meter embodying the preferred form of my invention. Fig. 4 represents a side elevation of a water meter partly in section illustrating a modification of my invention. Fig. 5 represents a sectional elevation of a cap designed to connect the openings in that part of the valve stem occupied by the meter when the same is removed. Fig. 6 represents a fragmentary sectional view of a meter illustrating another modification of my invention. Fig. 7 illustrates a plan view of one of the details, and Figs. 8 and 9 illustrate other forms of connection between the meter or other translating mechanism and the fitting.

Similar letters of reference indicate corresponding parts.

In the drawings, $a$ represents the outer case of the motor or meter made in sections and secured together by suitable devices and supported in the interior of the outer case is a case $b$ which is known as the disk chamber. This disk chamber may be variously constructed, but is shown as composed essentially of two parts, the upper casing $b'$ and the lower casing $b^2$ which are suitably secured together. These casings are made in the form of cone frusta, placed reversely toward each other. Mounted in this case is a disk or piston $c$ which is formed with, or connected to a central ball $d$ which is supported in sockets $d'$ and $d^2$, in the respective cone frusta, which allows the disk to vibrate and move partly in the disk chamber under the action of the fluid passing therethrough or acting upon the fluid passing therethrough. It is also desirable to have some means whereby motion may be transmitted to the disk, or the motion of the disk may be transmitted to other mechanism; such for instance, as the registering mechanism in a water meter when the invention is used as a water meter. To do this, I provide a spindle $e$ and this spindle is arranged to be connected to the operating or operated mechanism not shown, by any suitable means.

$f$ represents an ordinary valve casing or fitting connected to the service pipe and provided with a ground chamber $f'$ for the reception of a ground core or plug $g$ preferably tapered and provided with direct flow port $h$ and a reverse flow port $h'$ which are designed to engage and register with the inlet and outlet in the valve casing or fitting $f$. This plug or core $g$ is secured to the valve casing or fitting by any suitable means, preferably as shown, consisting of a screw threaded tubular extension on said plug or core designed to engage with a nut which will prevent accidental displacement. It will be noticed that the ports $h$ and $h'$ of the core or plug extend upwardly and register with the water-ways $i$ and $i'$ common in meters of the class described. The upper end of the core $g$ is preferably made tapered to fit a tapered annular recess formed in the lower portion of the case $a$ of the meter and the core $g$ is permanently secured to the case of the meter by means of the cap $j$ which is counter-sunk and provided with a screw threaded extension $j'$ designed to engage with the screw threaded recess $j^2$ formed in the upper extremity of the core $g$.

It will thus be seen that I have shown and described in Fig. 1 a construction of a valve which is to be used in connection with water meters which will enable the meter to be attached directly to the valve by means of the screw threaded extension $j'$ of the cap $j$ which is permanently secured and counter-sunk in the case $a$ of the meter and at the same time permit the water to be turned on or off before removing the meter and also so arranged that putting on or detaching the meter shuts off the water from both the inlet and outlet.

$k$ is a screw or projection secured to the core $g$ in any convenient manner and designed to butt against a corresponding screw or projection conveniently arranged on or formed integral with the valve casing or fitting $f$ to prevent the core $g$ from being turned further than is necessary to shut off the water in the service pipe, while the meter is being removed from the upper part of the plug or core $g$.

In Fig. 2, I have shown a flange $l$ formed on the outer case of the meter which is provided with a hole registering with a corresponding hole formed in the loose ring $l'$ which is slipped over the pipe or connection $f$ and held in place by any convenient means such as a padlock for instance, to prevent the meter from being removed.

The structure illustrated in Fig. 3 so far as the valve proper is concerned, which consists of the valve casing or fitting $f$ and the plug or core $g$ and their relation to the meter is identical with the structure shown in Fig. 1, with this exception, the water-ways $i$ and $i'$ of the water meter communicate with annular grooves $m$ and $m'$ formed in the annular tapered recess located in the lower portion of the meter.

In the structure shown in Fig. 3, it will only be necessary when assembling the parts, to have the cores $h$ and $h'$ of the core $g$ register with the inlet and outlet of the fitting $f$ whereas in Fig. 1 in assembling it will be necessary to have the ports $h$ and $h'$ register with the inlet and outlet in the fitting $f$ and also with the water-ways $i$ and $i'$ of the case of the meter $a$.

In the modification illustrated in Fig. 4, the ordinary corporation cock $n$ may be employed, the core $n'$ of which is designed to receive and engage with a supplemental core $n^2$, which is formed integral with and made a part of the ordinary water meter now in use. The supplemental core $n^2$ which forms a part of the meter and engages with the core $n'$ of the corporation cock is provided with inlet $n^3$ and outlet $n^4$ adapted to register with the inlet and outlet in the core $n'$ of the corporation cock. This construction enables the meter to be removed from the corporation cock at the same time shutting off the flow of water in the service pipe.

Fig. 5 shows a cap $o$ having like cavities with the upper part of the plug or core $g$ which is designed to be secured to the core $g$ by means of the screw $o'$ in the event of the meter being removed for repair, or it may be secured to the core $g$ in place of the meter, so as to permit the flow of water. I have shown formed integral with the core $g$, rectangular projections $p$ designed to engage with any convenient or suitable means for the purpose of turning the core $g$ in the fitting $f$ in order to shut off or turn on the flow of water.

In the modification illustrated in Figs. 6 and 7, the lower portion of the meter $a$ is provided with a cylindrical opening for the reception of the plug or core $g$ which engages with the fitting $f$. This plug or core $g$ is provided with the usual inlets and outlets and in addition thereto, with a circular flange $q$ adapted to engage with and be secured to the under surface of the meter $a$ by means of the bolts $q'$. $q^2$ is a projection formed integral with the flange $q$ and designed to engage with a corresponding projection which may be formed integral with the fitting $f$, to prevent the plug or core $g$ from being turned further than is necessary to shut off the water in the service pipe, while the meter is being removed from the upper part of the plug or core $g$. The bolts $q'$ which are secured in the under side of the meter $a$ are adapted, preparatory to permanently securing the meter to the core, to pass through the elongated slots located in the flange $q$. The portion of the metal surrounding the elongated slots on the under side of the flange $q$ is slightly beveled and forms an inclined plane for the under side of the bolt $q'$ to travel upon by simply turning the meter so that the body of the bolts will be forced up into the slot, thus affording a ready means for detaching or attaching the meter to the valve.

In Fig. 8 I have shown a form which the device may take, and still accomplish the prime object of my invention. In this case, plug or core $g$ is made integral with the body of the meter or other translating device, and is secured to the fitting by means of the screws $j^2$, which becomes the timing screw and serves the same function substantially as the timing screw $j'$ in Figs. 1 and 3, the threads being so cut upon the plug and in the fitting that when the plug is screwed home, the passages in the plug will register with the passages in the fitting.

In Fig. 9, the parts are reversed. The plug $g$ and the fitting $f$ are integral while the meter is provided with a recess to receive the tapered plug, the passages $m$, $m'$ of the meter respectively registering with the passages $h$, $h'$ of the plug. In order to close off the pressure upon removing the meter, a globe or other shut-off valve may be located within the main or in the fitting and connected with the meter so that upon the rotation of the meter upon the fitting, the pressure will be cut off.

It will thus be seen that I have provided a structure whereby the rotation of the meter or other translating device, upon the fitting will simultaneously cut off the pressure through the fitting and permit the subsequent removal of the meter or translating device without the inconvenience of a flooding of the pit wherein the device is usually located. In case it is afterward desired to turn on the pressure after the removal of the meter, a cap may be secured over the end of the plug in the same manner as illustrated in Fig. 5.

I claim:

1. The combination of a water meter casing and a valve casing, inlet and discharge passages in each of said casings, a valve plug rigidly and directly secured to said water meter casing and rotatably secured to said valve casing, direct and return flow ports in said plug in normal registry respectively with the inlet and discharge passages of said casings to carry the entire flow of water from the valve casing inlet passage to the discharge passage through said meter casing passages, stops on said plug and valve casing respectively for limiting the rotation of said plug therein, whereby the rotation of the said meter and plug from normal position will completely close communication between said valve casing passages.

2. The combination of a water meter casing and a valve casing, each respectively having an inlet and a discharge passage, a plug rigidly and directly secured to one of said casings and rotatably secured to the other casing, direct and return flow ports in said plug in normal registry respectively with the inlet and discharge passages of said casings, whereby the entire flow of water through the inlet passage is conducted through the meter casing, or completely interrupted by the rotation of said meter casing relatively to said valve casing.

3. The combination of a water meter casing and a valve casing, each respectively having an inlet and a discharge passage, a plug rigidly and directly secured to one of said casings and rotatably secured to the other casing, direct and return flow ports in said plug in normal registry with the inlet and discharge passages in said casings, thereby affording communication between the passages in said valve casing by way of said meter casing only, and whereby upon the rotation from normal position of said meter casing relatively to said valve casing said communication is completely cut off.

4. In a water meter, a fluid transmission valve comprising a casing, a longitudinal passage therethrough for conveying fluid under pressure, a transverse aperture in said casing intersecting said passage, a plug or core rotatably secured in said aperture, said plug or core having a direct flow port and a return flow port therein, said ports being adapted for registry with said longitudinal passage, and a water meter directly and rigidly secured to and surrounding said plug or core, said meter having inlet and delivery ports in constant registry with said direct and return flow ports respectively.

5. A transmission valve for water meters, comprising a casing having inlet and delivery passages and a transverse aperture therein, a plug fitted into said transverse aperture, direct and return flow ports in said plug designed for registry with said inlet and delivery passages respectively, said ports opening through the head of said plug, a water meter, the head of said plug extending directly into and secured within a recess in the base of said water meter with the passages in said water meter in registry with said direct and return flow ports, and stops upon said plug and casing for limiting the rotation of said plug, whereby the initial rotation of said meter will interrupt the flow of water through said ports and passages and further rotation will release the meter from said plug.

6. A transmission valve for water meters, comprising a casing having a longitudinal passage therethrough, a transverse plug rotatably secured in said casing, said plug having direct and return flow ports therein for registry with said passage, said ports opening through the head of said plug, means for limiting the rotation to open or close said passage and a water meter having passages therein opening into a recess upon its under side, the head of said plug being secured within said recess with said direct and return flow ports in registry with the passages in said meter.

7. The combination of a water meter casing and a valve casing, inlet and discharge passages in each of said casings, a valve plug rigidly but detachably secured to said meter casing and rotatably secured in said valve casing, ports in said plug for establishing communication between said inlet passages and said discharge passages respectively, stops on said valve casing and said plug respectively, whereby the initial rotation of said meter and plug will close said ports and passages and further rotation of the meter will detach the same from said plug.

8. A fluid transmission valve, consisting of a valve casing and a core or plug therefor, a direct passage through said casing, said core or plug having a direct flow port and a return flow port therein, a translating mechanism directly and rotatably secured to and surrounding said core or plug, ports or passages in said translating mechanism registering respectively with the ports in said core or plug, whereby fluid may be conveyed through said casing by way of said direct flow port through said translating mechanism and return flow port.

9. A fluid transmission valve, comprising a core provided with a direct flow port and a return flow port, and a translating device directly and rotatably secured to and surrounding said core, said translating device being provided with ports or passages in registry with the ports in said core respectively, whereby fluid through said valve may be continuously transmitted or interrupted by the rotation of said translating device.

10. In a fluid transmission mechanism, the combination of a valve casing, a passage through said casing a valve core interposed in said casing, across said passage a direct flow port and a return flow port in said core, said core designed to permit or to interrupt the continuous transmission of fluid by way of said direct and return flow ports through said casing passage, and translating mechanism directly secured to and surrounding said core, said mechanism being provided with ports or passages in registry with the ports in said core.

11. In a fluid transmission mechanism, the combination of a valve casing having a passage therethrough, a valve plug or core in said casing, translating mechanism secured directly to and surrounding said plug or core, a direct flow port and a return flow port in said plug or core designed to register simultaneously with the passage in said casing, ports or passages in said translating mechanism in registry respectively with the direct flow port and the return flow port of said plug or core, whereby fluid may be conveyed through said casing by way of said direct flow port, through said translating mechanism and return flow port.

12. A by-pass transmission valve, for fluid pressure devices, comprising a valve casing provided with inlet and discharge passages and a transverse aperture, a valve plug or core rotatably secured in said transverse aperture, a direct flow port and a return flow port in said plug or core, and a translating device directly secured to and surrounding said core and having passages therein which register with the ports of said plug or core, whereby the passage of fluid through said inlet and discharge passages by way of said direct flow port and return flow port may be interrupted by the rotation of said core or plug.

13. In a fluid transmitting device, the combination of a fitting provided with inlet and discharge passages, a plug or core secured to said fitting having direct and return flow ports in registry respectively with said inlet and discharge passages and a translating device secured to and surrounding said plug, said translating device having a passage therethrough which registers with both direct and return flow ports of the plug.

14. In a fluid transmission device, the combination of a fitting provided with inlet and discharge passages, a translating device directly and rotatably secured to said fitting and provided with a passage therethrough in registry with the passages respectively in said fitting, means in said fitting in connection with said translating device, whereby upon the rotation of said translating device the passages in said fitting are cut off.

15. In a fluid transmission device, a fitting provided with inlet and discharge passages, a translating device rotatably but detachably secured to said fitting, passages in said translating device normally in registry with said passages in said fitting, whereby upon the initial rotation of said translating device, the transfer of pressure through all of said passages is interrupted and upon further rotation, said meter is detached from said fitting.

16. A fitting for fluid mains, having inlet and discharge passages, a by-pass leading from said inlet passage, a second by-pass connecting with the discharge passage of the fitting in combination with a meter having a passage therein designed for normal registry with said by-passes respectively, said meter being rotatably but detachably secured to said fitting, whereby upon the initial rotation of said meter, said by-passes are closed and upon further rotation, said meter is detached.

This specification signed and witnessed this 3rd day of February, 1906.

ERNEST E. GAMON.

Witnesses:
FRED'K C. FISCHER,
C. A. ALLISTON.